United States Patent
Benson et al.

(10) Patent No.: US 9,654,483 B1
(45) Date of Patent: May 16, 2017

(54) NETWORK COMMUNICATION RATE LIMITER

(71) Applicant: Amazon Technologies, Inc., Seattle, WA (US)

(72) Inventors: Bryan Mark Benson, Seattle, WA (US); Michael F. Diggins, Seattle, WA (US); Anton Romanov, Seattle, WA (US); David Dongyi Lu, Seattle, WA (US); Xingbo Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/582,054

(22) Filed: Dec. 23, 2014

(51) Int. Cl.
*H04L 29/06* (2006.01)

(52) U.S. Cl.
CPC ........ *H04L 63/108* (2013.01); *H04L 63/1466* (2013.01)

(58) Field of Classification Search
CPC ..................... H04L 63/108; H04L 63/1466
USPC ............................. 713/156, 185, 172; 726/4
See application file for complete search history.

(56) References Cited

U.S. PATENT DOCUMENTS

| | | | | |
|---|---|---|---|---|
| 4,691,277 A * | 9/1987 | Kronstadt | ............. | G06F 9/3806 711/213 |
| 5,142,634 A * | 8/1992 | Fite | ........................ | G06F 9/3844 712/237 |
| 5,237,666 A * | 8/1993 | Suzuki | ................ | G06F 9/30021 712/240 |
| 5,732,254 A * | 3/1998 | Tanimoto | .............. | G06F 9/3861 712/240 |
| 5,745,490 A * | 4/1998 | Ghufran | .............. | H04L 12/5602 370/397 |
| 5,757,795 A * | 5/1998 | Schnell | ................. | H04L 45/745 370/392 |
| 6,530,016 B1 * | 3/2003 | Ukai | .................... | G06F 9/30054 712/237 |
| 6,687,247 B1 * | 2/2004 | Wilford | .............. | H04L 12/5693 370/392 |
| 6,801,500 B1 * | 10/2004 | Chandran | ........... | H04L 12/5602 370/230.1 |

(Continued)

OTHER PUBLICATIONS

Amarjit Kaur, The Robust system for antivenin DDOS by Rioter Puddle Expertise, IJIRAE, Mar. 2014.*

(Continued)

*Primary Examiner* — David Garcia Cervetti
(74) *Attorney, Agent, or Firm* — Thorpe North & Western LLP

(57) ABSTRACT

A technology is described for limiting the rate at which a number of requests to perform a network action are granted using rate limiters. An example method may include receiving a request for a token granting permission to perform a network action via a computer network. In response, rate limiters may be identified by generating hash values using hash functions and a network address representing a source network where the hash values identify memory locations for the rate limiters. The rate limiters may have a computer memory capacity to store tokens that are distributed in response to the request. Token balances for the rate limiters may be determined, and permission to perform the network action may be granted as a result of at least one of the token balances being greater than zero.

20 Claims, 10 Drawing Sheets

(56) References Cited

U.S. PATENT DOCUMENTS

| | | | | |
|---|---|---|---|---|
| 6,819,671 B1* | 11/2004 | Chen | H04L 49/351 | 370/389 |
| 6,882,642 B1* | 4/2005 | Kejriwal | H04L 47/10 | 370/388 |
| 6,925,055 B1* | 8/2005 | Erimli | H04L 47/10 | 370/229 |
| 6,950,395 B1* | 9/2005 | Bashandy | H04L 12/5602 | 370/230.1 |
| 7,089,326 B2* | 8/2006 | Boucher | H04L 29/06 | 709/223 |
| 7,215,637 B1* | 5/2007 | Ferguson | H04L 45/00 | 370/230.1 |
| 7,385,987 B1* | 6/2008 | Charny | H04L 12/5693 | 370/395.4 |
| 7,567,572 B1* | 7/2009 | Charny | H04L 12/5693 | 370/395.4 |
| 7,586,848 B1* | 9/2009 | Gunduzhan | H04L 47/10 | 370/235 |
| 7,593,334 B1* | 9/2009 | Mammen | H04L 47/10 | 370/235 |
| 7,664,028 B1* | 2/2010 | Gingras | H04L 41/5022 | 370/229 |
| 8,032,653 B1* | 10/2011 | Liu | H04L 47/10 | 370/235.1 |
| 8,169,901 B1* | 5/2012 | Scholte | H04L 63/1458 | 370/230.1 |
| 8,320,240 B2* | 11/2012 | Kwan | H04L 12/5693 | 370/229 |
| 8,665,722 B2* | 3/2014 | Szymanski | H04L 12/5693 | 370/235 |
| 8,681,630 B1* | 3/2014 | Gibson | H04L 67/325 | 370/235 |
| 8,908,522 B2* | 12/2014 | Smith, Jr. | H04L 43/0894 | 370/235 |
| 8,914,497 B1* | 12/2014 | Xiao | H04L 67/16 | 370/235 |
| 8,935,781 B1* | 1/2015 | Muth | G06F 21/74 | 726/22 |
| 8,953,453 B1* | 2/2015 | Xiao | H04L 47/12 | 370/230 |
| 9,129,062 B1* | 9/2015 | Adams | G06F 11/3644 | |
| 9,137,136 B2* | 9/2015 | Malloy | H04L 67/025 | |
| 9,213,551 B2* | 12/2015 | Shah | G06F 9/3851 | |
| 2002/0097677 A1* | 7/2002 | Hoar | H04L 47/10 | 370/230 |
| 2002/0116527 A1* | 8/2002 | Chen | H04L 45/00 | 709/245 |
| 2003/0165160 A1* | 9/2003 | Minami | H04L 29/06 | 370/466 |
| 2004/0054924 A1* | 3/2004 | Chuah | H04L 47/10 | 726/22 |
| 2004/0095934 A1* | 5/2004 | Cheng | H04L 45/38 | 370/390 |
| 2004/0133777 A1* | 7/2004 | Kiriansky | G06F 21/554 | 713/166 |
| 2004/0151184 A1* | 8/2004 | Wang | H04L 12/5693 | 370/395.2 |
| 2005/0010804 A1* | 1/2005 | Bruening | G06F 21/52 | 726/1 |
| 2005/0108562 A1* | 5/2005 | Khazan | G06F 11/3604 | 726/23 |
| 2005/0175014 A1* | 8/2005 | Patrick | H04L 12/5693 | 370/395.43 |
| 2005/0198645 A1* | 9/2005 | Marr | G06F 21/606 | 719/310 |
| 2005/0229254 A1* | 10/2005 | Singh | G06F 21/55 | 726/23 |
| 2005/0257033 A1* | 11/2005 | Elias | G06F 9/30058 | 712/236 |
| 2006/0077904 A1* | 4/2006 | Brandenburg | H04L 47/10 | 370/252 |
| 2006/0146703 A1* | 7/2006 | Cha | H04L 12/2602 | 370/229 |
| 2006/0168281 A1* | 7/2006 | Starr | H04L 69/16 | 709/230 |
| 2006/0268719 A1* | 11/2006 | Takase | H04L 47/10 | 370/235.1 |
| 2006/0294346 A1* | 12/2006 | Stempel | G06F 9/3806 | 712/242 |
| 2007/0110053 A1* | 5/2007 | Soni | H04L 63/0263 | 370/389 |
| 2007/0113291 A1* | 5/2007 | Dai | G06F 21/629 | 726/27 |
| 2007/0115817 A1* | 5/2007 | Gupta | H04L 12/66 | 370/230 |
| 2007/0153682 A1* | 7/2007 | Swenson | H04L 47/10 | 370/229 |
| 2007/0248084 A1* | 10/2007 | Whitehead | H04L 63/1466 | 370/389 |
| 2007/0253430 A1* | 11/2007 | Minami | H04L 12/2856 | 370/395.52 |
| 2008/0008090 A1* | 1/2008 | Gilfix | H04L 12/5695 | 370/230 |
| 2008/0008094 A1* | 1/2008 | Gilfix | H04L 67/322 | 370/235 |
| 2008/0008095 A1* | 1/2008 | Gilfix | H04L 47/10 | 370/235 |
| 2008/0022136 A1* | 1/2008 | Mattsson | G06F 21/6227 | 713/194 |
| 2008/0025214 A1* | 1/2008 | Bettink | H04L 47/10 | 370/230 |
| 2008/0095053 A1* | 4/2008 | Chen | H04L 47/215 | 370/230.1 |
| 2008/0140853 A1* | 6/2008 | Harrison | H04L 47/10 | 709/231 |
| 2008/0256346 A1* | 10/2008 | Lee | G06F 9/322 | 712/239 |
| 2008/0259798 A1* | 10/2008 | Loh | H04L 45/302 | 370/235 |
| 2009/0003204 A1* | 1/2009 | Okholm | H04L 47/10 | 370/230 |
| 2009/0010161 A1* | 1/2009 | Zhang | H04L 12/437 | 370/235 |
| 2009/0021572 A1* | 1/2009 | Garudadri | H04L 47/10 | 348/14.01 |
| 2009/0083517 A1* | 3/2009 | Riddle | G06F 9/526 | 712/30 |
| 2009/0196175 A1* | 8/2009 | Sammour | H04W 36/02 | 370/230.1 |
| 2009/0219816 A1* | 9/2009 | Rezaiifar | H04W 74/0866 | 370/235 |
| 2009/0222646 A1* | 9/2009 | Ohba | G06F 11/3636 | 712/227 |
| 2010/0046368 A1* | 2/2010 | Kaempfer | H04L 47/10 | 370/231 |
| 2010/0054126 A1* | 3/2010 | Kwan | H04L 47/10 | 370/235 |
| 2010/0085874 A1* | 4/2010 | Noy | H04L 12/5695 | 370/230 |
| 2010/0177635 A1* | 7/2010 | Figueira | H04L 47/10 | 370/230 |
| 2010/0208591 A1* | 8/2010 | Corliano | H04L 47/10 | 370/237 |
| 2010/0214925 A1* | 8/2010 | Gormley | H04L 47/10 | 370/235.1 |
| 2010/0246596 A1* | 9/2010 | Nakamura | H04L 47/10 | 370/428 |
| 2010/0260044 A1* | 10/2010 | Gormley | H04L 47/215 | 370/230 |
| 2010/0271946 A1* | 10/2010 | Davari | H04L 47/10 | 370/232 |
| 2010/0293275 A1* | 11/2010 | Rezaiifar | H04L 12/5695 | 709/225 |
| 2010/0322071 A1* | 12/2010 | Avdanin | H04L 43/0894 | 370/230 |
| 2011/0022812 A1* | 1/2011 | van der Linden | G06F 9/5077 | 711/163 |

(56) References Cited

U.S. PATENT DOCUMENTS

| | | | |
|---|---|---|---|
| 2011/0083175 A1* | 4/2011 | Bharrat | H04L 47/20 726/13 |
| 2011/0096666 A1* | 4/2011 | Davari | H04L 47/10 370/235 |
| 2011/0122691 A1* | 5/2011 | Sprouse | G06F 1/28 365/185.03 |
| 2011/0134924 A1* | 6/2011 | Hewson | H04L 12/4625 370/392 |
| 2011/0199899 A1* | 8/2011 | Lemaire | H04L 47/2416 370/230.1 |
| 2011/0243139 A1* | 10/2011 | Nishimura | H04L 47/10 370/394 |
| 2012/0092993 A1* | 4/2012 | Kan | H04L 47/12 370/235 |
| 2012/0120798 A1* | 5/2012 | Jacquet | H04L 43/0882 370/230 |
| 2012/0140668 A1* | 6/2012 | Xiao | H04W 56/005 370/252 |
| 2012/0148247 A1* | 6/2012 | Skubic | H04L 47/10 398/58 |
| 2013/0031605 A1* | 1/2013 | Huston, III | H04L 67/02 726/3 |
| 2013/0091241 A1* | 4/2013 | Goetz | H04L 67/322 709/217 |
| 2013/0160121 A1* | 6/2013 | Yazdani | G06F 21/54 726/23 |
| 2013/0279520 A1* | 10/2013 | Figueira | H04L 41/0896 370/468 |
| 2013/0346415 A1* | 12/2013 | Tomlinson | G06F 17/30958 707/741 |
| 2013/0346700 A1* | 12/2013 | Tomlinson | G06F 9/526 711/133 |
| 2013/0346719 A1* | 12/2013 | Tomlinson | G06F 12/10 711/165 |
| 2014/0016463 A1* | 1/2014 | Kitada | H04L 47/20 370/230.1 |
| 2014/0105020 A1* | 4/2014 | Mitsumori | H04L 47/16 370/235 |
| 2014/0112147 A1* | 4/2014 | Esposito | H04L 47/215 370/235.1 |
| 2014/0112148 A1* | 4/2014 | Flinta | H04L 43/087 370/235.1 |
| 2014/0143300 A1* | 5/2014 | Karlsson | H04L 67/101 709/203 |
| 2014/0157405 A1* | 6/2014 | Joll | H04L 63/1425 726/22 |
| 2014/0180915 A1* | 6/2014 | Montulli | G06Q 30/04 705/40 |
| 2014/0181016 A1* | 6/2014 | Whitehead | G06F 11/00 707/613 |
| 2014/0181021 A1* | 6/2014 | Montulli | G06F 17/30174 707/624 |
| 2014/0181027 A1* | 6/2014 | Whitehead | G06F 17/30174 707/639 |
| 2014/0181034 A1* | 6/2014 | Harrison | G06F 17/3007 707/646 |
| 2014/0181039 A1* | 6/2014 | Harrison | G06F 17/30091 707/652 |
| 2014/0181040 A1* | 6/2014 | Montulli | G06F 11/1451 707/652 |
| 2014/0181041 A1* | 6/2014 | Whitehead | G06F 11/1448 707/652 |
| 2014/0181051 A1* | 6/2014 | Montulli | G06F 17/30129 707/679 |
| 2014/0254384 A1* | 9/2014 | Ginzboorg | H04W 24/02 370/235.1 |
| 2014/0255027 A1* | 9/2014 | Hood | H04J 14/0221 398/58 |
| 2014/0269314 A1* | 9/2014 | Ozer | H04L 47/25 370/235 |
| 2014/0279905 A1* | 9/2014 | Muniswamy-Reddy | G06F 11/20 707/639 |
| 2014/0301195 A1* | 10/2014 | Briscoe | H04L 47/11 370/230.1 |
| 2014/0321458 A1* | 10/2014 | Kariya | H04L 49/3009 370/359 |
| 2014/0359765 A1* | 12/2014 | Chen | G06F 21/51 726/22 |
| 2014/0379922 A1* | 12/2014 | Xiao | H04L 47/70 709/226 |
| 2015/0007142 A1* | 1/2015 | Biffle | G06F 21/53 717/126 |
| 2015/0016266 A1* | 1/2015 | Dumitrescu | H04L 47/623 370/236 |
| 2015/0071074 A1* | 3/2015 | Zaidi | H04L 45/308 370/235.1 |
| 2015/0074285 A1* | 3/2015 | Gahm | H04L 47/11 709/231 |
| 2015/0095628 A1* | 4/2015 | Yamada | G06F 21/54 712/234 |
| 2015/0106588 A1* | 4/2015 | Godard | G06F 12/0893 711/221 |
| 2015/0117214 A1* | 4/2015 | Li | H04L 43/0894 370/235.1 |
| 2015/0121161 A1* | 4/2015 | Cousins | H04L 1/1858 714/749 |
| 2015/0128236 A1* | 5/2015 | Moscicki | H04L 63/0876 726/7 |
| 2015/0178015 A1* | 6/2015 | Povzner | G06F 3/0653 710/18 |
| 2015/0195205 A1* | 7/2015 | Flinta | H04L 47/22 370/230.1 |
| 2015/0195210 A1* | 7/2015 | Tsuruoka | H04L 47/266 370/235 |
| 2015/0256466 A1* | 9/2015 | Roitshtein | H04L 47/2483 709/234 |
| 2015/0312156 A1* | 10/2015 | Kitada | H04L 43/0882 370/235 |
| 2015/0319064 A1* | 11/2015 | Oishi | H04L 1/1877 370/241.1 |
| 2015/0331743 A1* | 11/2015 | Wallace | G11C 29/52 714/807 |
| 2015/0334024 A1* | 11/2015 | Mogul | H04L 47/22 370/237 |
| 2015/0334596 A1* | 11/2015 | Szilagyi | H04W 28/0289 370/232 |
| 2015/0356294 A1* | 12/2015 | Tan | G06F 8/427 726/22 |
| 2015/0370560 A1* | 12/2015 | Tan | G06F 9/30058 717/148 |
| 2016/0044695 A1* | 2/2016 | Gunner | H04L 47/00 370/336 |
| 2016/0134514 A1* | 5/2016 | Hui | H04L 45/12 370/254 |
| 2016/0323172 A1* | 11/2016 | Friend | H04L 43/028 |

OTHER PUBLICATIONS

Lee et al., DDoS attack detection method using cluster analysis, Elsevier, 2008.*
Douligeris et al., DDoS attacks and defense mechanisms: classification and state-of-the-art, Elsevier, 2004.*
Priescu et al., Design of Traceback Methods for Tracking DoS Attacks, IEEE, 2009.*
Sun et al., Preventing DDoS attacks on internet servers exploiting P2P systems, 2010, Elsevier.*
Sung et al., Scalable Hash-based IP Traceback using Rate-limited Probabilistic Packet Marking, 2006, Georgia Institute of Technology.*
Mukhopadhyay et al., A Study on Recent Approaches in Handling DDoS Attacks, 2010, IEEE.*
Zargar et al., A Survey of Defense Mechanisms Against Distributed Denial of Service (DDoS) Flooding Attacks, 2013, IEEE.*
Lu et al., Robust and efficient detection of DDoS attacks for large-scale internet, 2007, Elsevier.*
El Defrawy et al., Optimal Allocation of Filters against DDoS Attacks, 2007, IEEE.*

(56) References Cited

OTHER PUBLICATIONS

Jing et al., O2-DN: An Overlay-based Distributed Rate Limit Framework to Defeat DDoS Attacks, 2006, IEEE.*
Blackert et al., Analyzing Interaction Between Distributed Denial of Service Attacks and Mitigation Technologies, 2003, IEEE.*
Kumar et al., Traceback Techniques against DDOS Attacks: A Comprehensive Review, 2011, IEEE.*

* cited by examiner

```
* = now period
| = period boundary

[-----------------------------|=|=|=|=| * |=|++++++++++++++++++++++++++++++++++]
\----PAST PERIODS ---|-NOW-PD--|------------------FUTURE-PERIODS----------/

** Period Rollover
[-----------------------------|=|=|=|=|=| * |++++++++++++++++++++++++++++++++++]
\----PAST PERIODS ---|-NOW-PD--|------------------FUTURE-PERIODS----------/

** Period overflow
[------------------------------------------| * |=|=|=|=|=|++++++++++++++++++++++]
\----PAST PERIODS ----|--OLD-PD--|-NOW-PD--|--FUTURE-PERIODS------------/
```

FIG. 2c

NETWORK COMMUNICATION RATE LIMITER

BACKGROUND

Computing service systems in computing service environments are often targets for malicious attacks conducted over a computing network. These malicious attacks can potentially cause a targeted computing service system to slow to a point that physical hosts included in the computing service system are unable to respond to legitimate network requests. For example, a DDoS (Distributed Denial of Service) attack may be a type of malicious attack that distributes a DoS (Denial of Service) program among several computing devices that in turn flood a computing service system with network packets (e.g., SYN (synchronization) packets) to initiate a network connection. The flood of network packets may cause network performance to slow resulting in system paralysis for the computing service system.

In the event of a malicious attack, computing service providers may have a difficult time identifying non-malicious network traffic from malicious network traffic. For example, a DDoS attack may involve multiple computing devices sending requests to perform some type of network action to a target computing service system. The IP (Internet Protocol) address for the computing devices may be changed in an attempt to make the request appear to originate from a legitimate or known client device, thereby making identification of the attacking computing devices problematic.

BRIEF DESCRIPTION OF THE DRAWINGS

FIG. 2c is a diagram illustrating an example overflow window associated with a time counter data structure.

DETAILED DESCRIPTION

Figure 1:
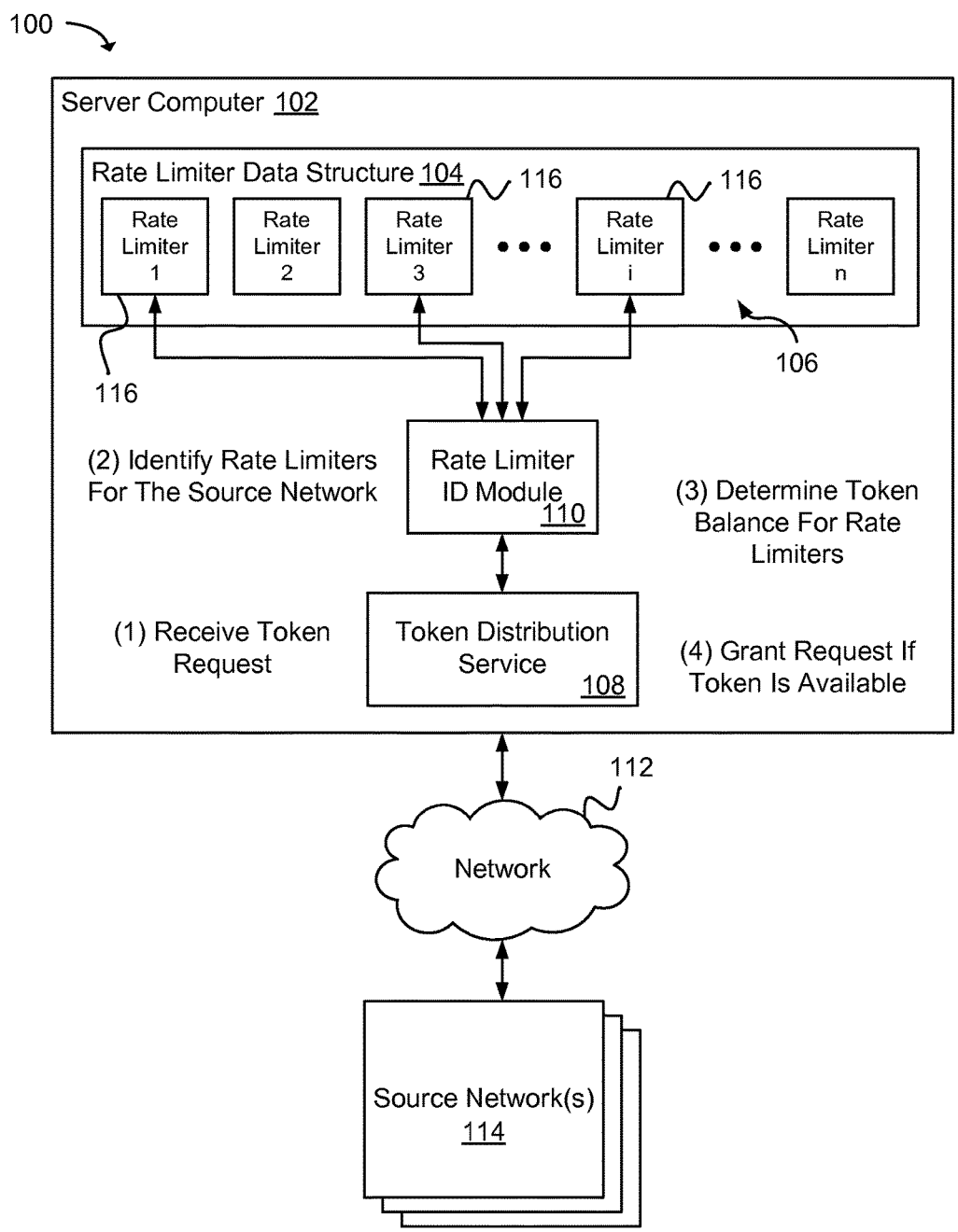
FIG. 1 is a block diagram illustrating an example system for rate limiting requests received from source networks.

A technology is described for limiting the rate at which requests for further processing of network communications associated with source networks are granted using a rate limiter. For example, a number of rate limiters may be included in a data structure where each rate limiter included in the data structure may have a capacity to store a number of tokens that may be distributed in response to a request over a network to perform a network action (e.g., a request to establish a network connection with a destination host). When receiving a request from a source network, token balances for a number of rate limiters for the source network may be checked and if at least one of the token balances is greater than zero, the request may be granted. Whereas, if the token balances are equal to zero, then a time counter may be referenced to determine whether additional tokens can be added to the token balances of the rate limiters.

In one example configuration, a request for a token to perform a network action may be received. The request may be for any network action that may be transmitted from a source client (e.g., a source host) to a destination host using a network packet. For example, the request may be a request to establish a network connection with a destination host. The request may be associated with a network address (e.g., IP address) that may be used to identify a source network from which the request originates. Using the network address of the source network, k rate limiters (where k=two or more) for the source network may be identified by generating k hash values from the network address using k hash functions where the k hash values identify k memory locations containing the k rate limiters. The rate limiters may be included in a data structure where the rate limiters may have a capacity to store a number of tokens. In one example, a token may represent an approval to perform an electronic communication in response to a request. However, no actual electronic object may be distributed by a rate limiter. For example, a numeric value may represent a token balance (i.e., a number of tokens) stored by a rate limiter. Upon distributing a token, a request may be granted and the numeric value of a token balance may be decremented by one token. In another example, a token may be an electronic object that may be distributed in response to a request where distribution of the token would cause the token balance for a rate limiter to be reduced by one token.

After identifying rate limiters for the source network, a token balance for each of the rate limiters may be determined and a token may be distributed if the value of any of the token balances is not equal to zero. In the case that the values of the token balances are zero, a countdown counter or a timestamp may be referenced to determine whether a predetermined amount of time has passed that will allow the token balances to be refilled for the rate limiters. Where a predetermined amount of time has passed, additional tokens may be added to the token balances of the rate limiters, as well as to the token balances of the other rate limiters included in the data structure. The number of tokens added to the token balances of rate limiters included in the data structure may depend on an amount of time that has passed since tokens were last added to the rate limiters. For example, a time unit may be defined and a predetermined number of tokens may be added to the rate limiters for each time unit that has passed since tokens were last added to the rate limiters.

Further, multiple rate limiter data structures each having an individual countdown counter or a timestamp may be used to rate limit network communication requests received from source networks. For example, when identifying rate limiters for the source network, one or more rate limiters may be included in a first data structure and one or more other rate limiters may be included in a second and/or third data structure.

Malicious attacks like a DDoS attack may result in a flood of requests to establish a network connection with a destination host. Because the requests may be originating from a large number of source networks, it may be difficult to distinguish non-malicious requests from malicious requests using a technique that does not consume a large amount of processing and memory resources. As a result of the technology disclosed herein, requests associated with a malicious actor that are granted may be reduced by using rate limiters to limit the number of requests granted during a defined time period. The data structure containing the rate limiters may be configured to use a small amount of memory as compared to creating a rate limiter for every IP address associated with a request, and a method used to maintain a token balance for each of the rate limiters may be configured to minimize an amount of processor resources used to maintain the token balances.

FIG. 1 is a diagram illustrating a high level example of a system 100 that may be used to rate limit requests (e.g., network requests or network packets) received from a source network 114. The system 100 may include a server computer 102 that may be in communication with a number of source networks 114. In one example, the server computer 102 may be used as a network traffic inspection and attack mitigation device that works with network edge devices and/or routers (not shown) to regulate network traffic. A network edge device may be a network router, switch, gateway, or other network device that provides an entry point into a computer network. In one example, a source network 114 may include a plurality of source clients (e.g., host computing devices) that make requests to a destination host over a network 112. The request may be to perform a network action that may be used as part of a DDoS attack, such as an action requesting to establish a network connection with a destination host, as well as any other action that may not be related to malicious activity. For purposes of convenience, the present technology will be described in reference to a network action to establish a network connection with a destination host (e.g., a SYN request) with the understanding that a request received from a source network may be for any action that may be transmitted to a destination host.

In one example configuration, the server computer 102 may include a token distribution service 108 that may receive requests for a token granting permission to further process a network communication (e.g., forwarding packets or establishing a TCP connection with a destination host) received from a source network 114. The server computer 102 may include one or more rate limiter data structures 104 each containing a number of rate limiters 116 contained within computer memory. Each rate limiter 116 may have a capacity to store a number of tokens that may be distributed in response to requests received from the source networks 114.

A source network 114 may include multiple source clients that may connect to a destination host by way of a publicly exposed network address. In one example, a source network 114 may be identified using a portion of a network address reserved for network identity. As an illustration, the first three bytes of an IPv4 address may be used to identify a source network 114. As a result, the source network 114 may represent multiple source clients. For example, a source network represented by the first three bytes of an IPv4 address may include a number of source clients that can be represented by the fourth byte of the IPv4 address (e.g., up to 255 source clients).

A number of rate limiters 106 for a source network 114 may be identified using a rate limiter ID (Identification) module 110, which may hash a network address for a source network 114 using multiple (k) hash functions to identify multiple rate limiters 116 for the source network 114. For example, when a request is received from a source network 114, the network address for the source network 114 may be provided to the rate limiter ID module 110, which may use k hash functions (e.g., three, five or seven hash functions) to generate k hash values using the network address for a client or computing device in the source network 114. The rate limiter ID module 110 may map the resulting hash values to k memory locations each containing a rate limiter 116. As a specific example, three hash functions may be used to generate three hash values from a source network address. The three hash values may then be used to identify three different memory locations each containing a rate limiter.

As one example of a method that may utilize the token distribution service 108, after (1) receiving a request from a source network 114, the token distribution service 108 may provide a network address for a client in the source network 114 to the rate limiter ID module 110. The network address may be used by the rate limiter ID module 110 to (2) identify k memory locations for k rate limiters 116 for the source network 114.

Having identified the rate limiters 116 for the source network 114, the token distribution service 108 may be configured to (3) determine a token balance for each of the rate limiters 116. In the case that any of the token balances for the rate limiters 116 may be greater than zero (i.e., a token may be available to distribute from one of the rate limiters 116), the request made by the source network 114 may be granted (4) and the token balance for the rate limiter 116 providing the token may be reduced by one token.

In the event that the token balances for the rate limiters 116 may be equal to zero (i.e., none of the rate limiters 116 contain tokens), a determination may be made whether a predetermined amount of time has passed that allows for additional tokens to be added to the rate limiters 116. If the predetermined amount of time has passed, then tokens may be added to the token balances of each rate limiter 106 included in a rate limiter data structure 104 and the request made by the client from the source network 114 may be granted. The token balance for the rate limiter 116 that provided the token may then be reduced by one token.

In one example, the number of tokens added to the rate limiters 116 may be a predetermined amount. As an illustration, after a predetermined amount of time (e.g., 5 milliseconds, 10 milliseconds, 1 second, etc.) a predetermined number of tokens (e.g., one thousand, ten thousand, five-hundred thousand) may be added to each token balance for each of the rate limiters 106 included in the rate limiter data structure 104.

In the case that the predetermined amount of time has not passed that allows for tokens to be added to the token balances of each rate limiter 106 contained in the rate limiter data structure 104, the request made by the source network 114 may be dropped or denied. As such, requests received from one or more source networks 114 that may be involved in a malicious attack upon a destination host may be throttled by limiting a number of the requests that are granted during a predetermined time period.

In one example configuration, a time counter or a countdown counter may be used to demarcate a time unit in which an allocation of tokens may be added to token balances for the rate limiters 106 contained in the rate limiter data structure 104. When checking the token balance of the rate limiters 116, the time counter or the countdown counter may be referenced to determine whether one or more time units has expired. Where at least one time unit has expired, a predetermined number of tokens may be added to the token balance of each rate limiter 106 for each time unit that has expired. As an illustration, a predetermined number of tokens added to each rate limiter 106 after the expiration of a time unit may be 10,000 tokens. Where one time unit may have expired, 10,000 tokens may be added to the token balance for each rate limiter; where two time units may have expired, 20,000 tokens may be added to the token balance for each rate limiter 106; where five time units may have expired, 50,000 tokens may be added to the token balance for each rate limiter 106 included in memory 104; and so forth.

The rate limiters 106 may have a defined capacity to store a particular number of tokens. As a result, when adding a predetermined number of tokens to the token balances for each rate limiter 106 included in memory 104, the lesser amount of the predetermined number of tokens or the token capacity minus the current token balance of a rate limiter 106 may be added to the token balances. As a specific example, a predetermined number of tokens added to the rate limiters 106 for each time unit that has expired may be 15,000 tokens and the token capacity of the rate limiters 106 may be 100,000 tokens. When adding the predetermined number of tokens to a particular rate limiter 116 having a token balance that may be equal to 95,000 tokens, the lesser of the predetermined amount of tokens (i.e., 15,000) and the token capacity (i.e., 100,000) minus the current token balance (i.e., 95,000) of the rate limiter 116 may be added to the token balance of the rate limiter 116, resulting in adding 5,000 tokens to the token balance of the rate limiter 116 instead of the predetermined number of 15,000 tokens.

Figure 2A:
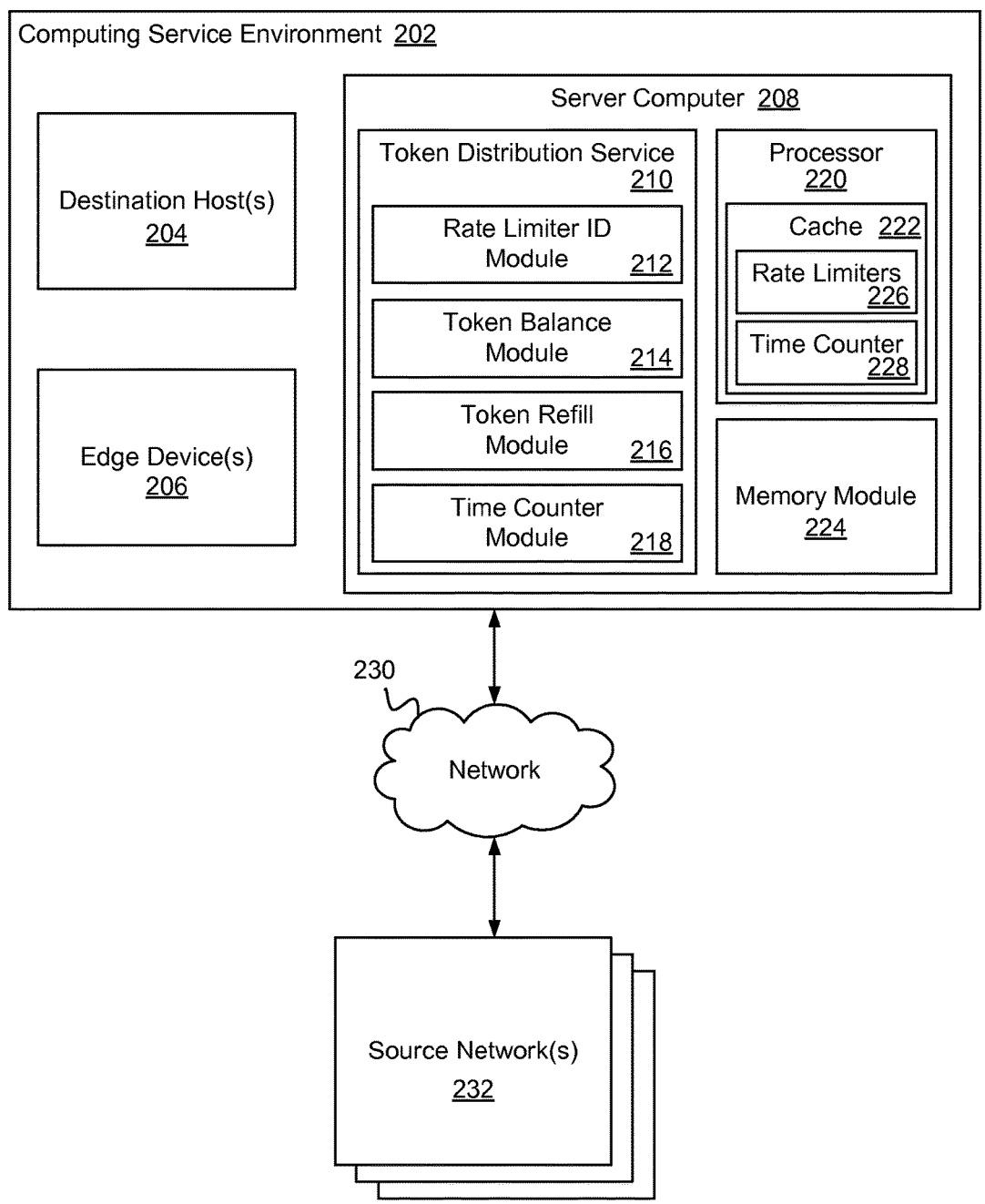
FIG. 2a is a block diagram that illustrates various example components included in a system for rate limiting requests received from source networks.

FIG. 2a illustrates components of an example computing service environment 202 on which the present technology may be executed. The computing service environment 202 may include a server computer 208, one or more edge devices 206, one or more destination hosts 204 as well as other components that may be included in a computing service environment 202 but are not illustrated. The computing service environment 202 may be in communication with a number of source networks 232 through a network 230 (e.g., the Internet) by way of an edge device 206. A source network 232 may include multiple source clients that may establish network connections with the destination hosts 204 included in the computing service environment 202.

The server computer 208 may include a token distribution service 210 that may be configured to distribute a token in response to an edge device 206 receiving a network connection request originating from a source client included in a source network 232. The token distribution service 210 may include various modules that perform the functions of the token distribution service 210. In one configuration, the modules included in the token distribution service 210 may include a rate limiter ID module 212, a token balance module 214, a token refill module 216 and a time counter module 218.

The rate limiter ID module 212 may be configured to identify rate limiters 226 for a source network 232 using a technique similar to a bloom filter (e.g., a Bloom limiter). The Bloom limiter may use a space-efficient probabilistic data structure used to identify rate limiters for a source network 232. The Bloom limiter may yield false positives that a source network 232 maps to a particular rate limiter 226, but does not yield false negatives. The more rate limiters 226 that are added to the data structure, the larger the probability of false positives. The Bloom limiter may provide a space advantage over other data structures, such as self-balancing search trees, tries, hash tables, or simple arrays or linked lists, thus the Bloom limiter may provide a memory space advantage when used to map source networks 232 to rate limiters 226.

The effectiveness of a Bloom limiter may be provided by hashing a source network identifier (e.g., a client's IP address on the source network) several times with independent hash functions. For example, k hashes may be used to identify k memory locations. The rate limiter ID module 212 may use a source network identifier to identify k memory locations that store rate limiters 226 for the source network 232. Rate limiters 226 may be included in a data structure stored in memory. In one example configuration, rate limiters 226 may be stored in the cache 222 (e.g., L1, L2 or L3 cache) of a processor 220. As a result, processing efficiency may be increased as compared to processing associated with storing the rate limiters 226 in a memory module 224, such as RAM (Random Access Memory). As an example, a cache line of a processor 220 may be used to store rate limiters 226 and a time counter 228 for the rate limiters 226. As a specific example, a cache line for a processor 220 may be 64 bytes, of which 62 bytes may be used to store 62 rate limiters 226 and 2 bytes may be used for a time counter 228.

Figure 2B:
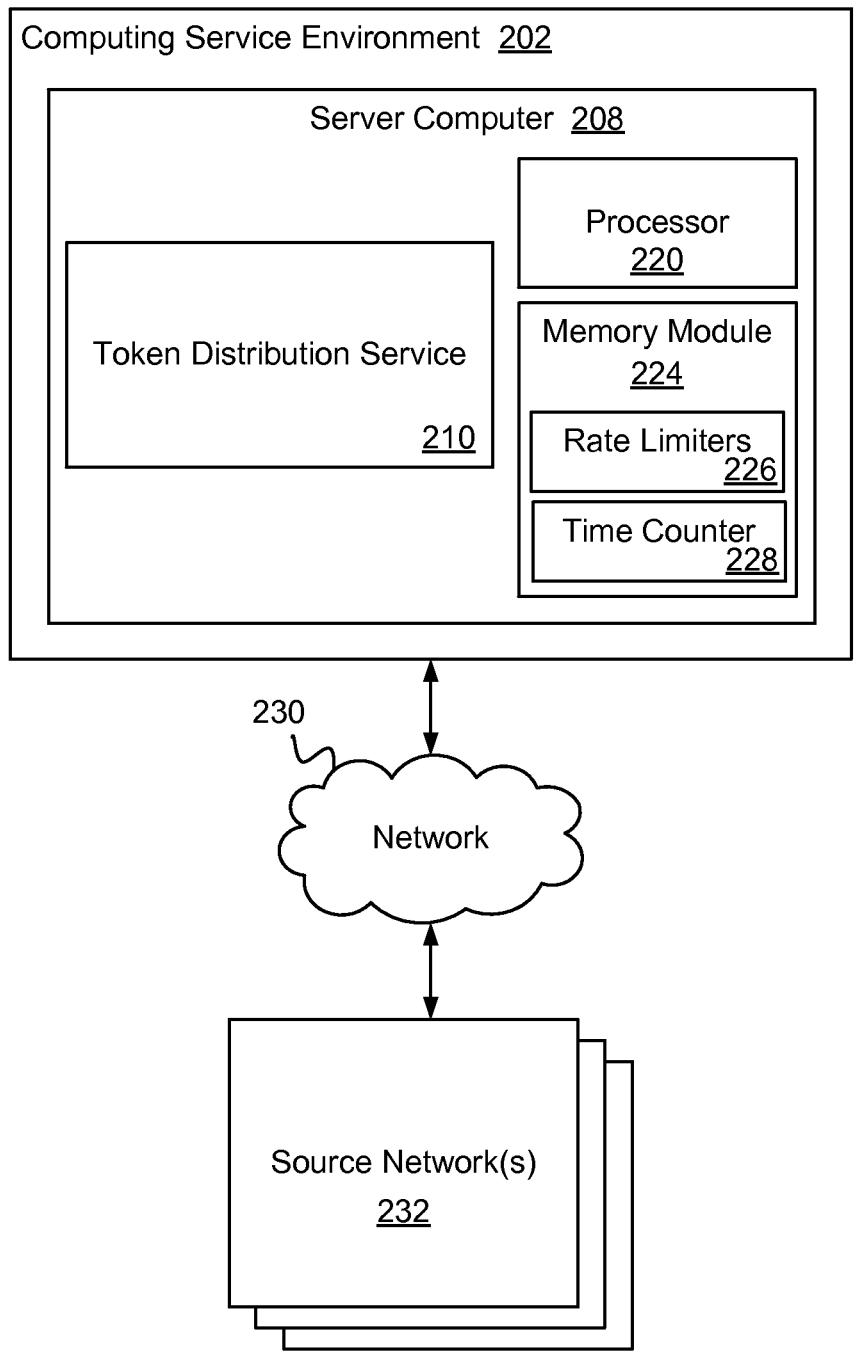
FIG. 2b is a block diagram illustrating a system for rate limiting requests received from source networks using rate limiters stored in a memory module.

Alternatively, as illustrated in FIG. 2b, a data structure containing rate limiters 226 may be stored in a memory module 224 such as RAM. For example, a memory module 224 having more memory storage than a cache 222 of a processor 220 may be selected to store the rate limiters 226 when an amount of memory needed to store the data structure containing the rate limiters 226 may be more than what is available in the cache 222 of the processor 220.

In one example, the source network identification used by the Bloom limiter to identify k rate limiters 226 may be a network address portion of a network address. For example, an IPv4 address has two parts, a network address and a host address where the first three bytes comprise the network address (e.g., 192.168.123.xxx) and the fourth byte comprises the host address (e.g., xxx.xxx.xxx.132). The network address of the IPv4 (e.g., 192.168.123.xxx) may be used as a source network identification but IPv6 or other network addressing schemes may be used. In another example, a source network identification may be an identification assigned to a source network 232 as defined by a computing service administrator or a computing service provider. For example, source clients that communicate with destination hosts 204 included in the computing service environment 202 may be identified and grouped into a source network 232 and a source network identification may be assigned to the source network 232. The above source network identification examples are illustrative and any method used to identify a source network 232 is within the scope of this disclosure.

The Bloom limiter may hash the source network identification using k hash functions. The resulting k hash values may then be used to identify k memory locations for k rate limiters 226 in the cache 222 of a processor 220. As such, the k rate limiters 226 identified may be associated with the source network 232 by way of the source network identification for the source network 232.

The token balance module 214 may be configured to determine a token balance for a rate limiter 226 identified by the rate limiter ID module 212. Each individual rate limiter 226 stored in memory may maintain a token balance up to a token capacity for the rate limiters 226. The token balance may be a number of available tokens stored in an individual rate limiter 226. As a result of granting a source network request, a token balance for a rate limiter 226 may be reduced by one token, and as a result of adding tokens to the rate limiters 226, the token balance of each individual rate limiter 226 may increase by the number of tokens added.

In determining a token balance for a rate limiter 226, a value stored in the memory location representing the rate limiter 226 may be read. The value may represent the token balance for the rate limiter 226 and may be analyzed to determine whether the value is greater than zero. In the case that the token balance is greater than zero, the token balance module 214 may be configured to reduce the token balance by one token, whereupon access to a source network request may then be granted.

Further, when the token balance is equal to zero, the token balance module 214 may be configured to determine whether tokens can be added to the token balance for the rate limiter 226. In making the determination, the time counter module 218 may be configured to reference a time counter 228 to check whether one or more time periods have expired that allows for additional tokens to be added to the token balance of the rate limiters 226. For example, the time counter 228 may be configured such that an increment of the time counter may represent a time unit since an allocation of tokens were last allocated to the rate limiters 226. Namely, the time counter 228 may be used to demarcate a time unit in which an allocation of tokens may be added to the rate limiters 226.

In one example, the time counter 228 may be a countdown counter. The countdown counter may be set to a predetermined amount of time and the countdown counter may countdown until reaching zero, at which time additional tokens may be added to the rate limiters 226. In another example, the time counter 228 may be a timestamp recording a time that additional tokens were last allocated to the rate limiters 226. Illustratively, when determining whether additional tokens can be added to the rate limiters 226, a system time may be referenced and the system time may be compared with the timestamp. Based on the comparison, a determination may be made whether a predetermined amount of time has passed since tokens were last allocated to the rate limiters 226.

In one example configuration, to reduce an amount of memory used to store a timestamp that acts as a time counter 228, the timestamp may be sized to an amount of memory selected to store the timestamp (e.g., 2 bytes, 4 bytes, etc.). For example, an integer representing a timestamp may be configured such that each increment of the integer represents a time unit (e.g., 10 milliseconds, 1 second, etc.) since a reference time in which tokens may be added to the rate limiters 226. The integer may be sized to the amount of memory space selected to store the timestamp using a computation that determines a number of time units that can be stored in the memory space. When determining whether one or more time units have expired, the timestamp may be compared to a system time by performing the same computation on the system time that was used to configure the timestamp.

The following illustrates how a timestamp acting as a time counter 228 may be configured to occupy a small amount of memory in the cache 222. Beginning with some background information, a "now" time may represent a user defined period. For example, a now time may be represented by 80 billion ticks (e.g., processor cycles) beginning from some point in time where one second comprises 2.6 billion ticks. Illustratively, a rate limiter 226 may be refilled 1000 times in a second.

In one example, a value representing the now time (e.g., 80 Billion) could be stored in a 64 bit (8 byte) integer and the number 2.6 Million could be added to the now time to represent an update period (in ticks) in which tokens may be added to the rate limiter 226. Although simple, this method may occupy more memory than what may be needed to track a next refill time.

As another example, by dividing the now time (e.g., 80 Billion) by the number of ticks in an update period (e.g., 2.6 Million) a courser granularity may be achieved that occupies less memory. For instance, instead of storing the value 80 Billion in memory the value 80 Billion/2.6 Million=30 may be stored. As such, the value 31 may be stored as the next update period, instead of the value 80,002,600,000, resulting in a savings of memory space.

Further, additional memory space savings may be realized by eliminating the higher, more significant bits of the value (e.g., 31) determined by dividing the now time by the update period. For example, the value (e.g., 31) may be represented by 32 bits. Because the higher bits of the value do not change often, the higher bits may be eliminated. As a result of eliminating the higher bits, overflow may be handled by calculating how many periods (e.g., seconds) exist between overflows for different integer sizes. For example, in the case that the update period is 1,000 updates per second, seconds between an overflow may comprise:

For 1 Byte of storage: (0–255=0.256 seconds)
For 2 Bytes of storage (0–65535=65 seconds)
For 3 Bytes of storage (0–16.7M=16.7K seconds ~4.6 hours)

This means that for accurate counting, there may need to be an update at least once per time period.

As a specific example:
Ticks per second=2,600,000,000
Updates per second=1,000
Update period=2,600,000 ticks
Now time=197,334,800,000 ticks
Now period=((197,334,800,000/2,600,000)=75,898)
75,898 (unit16_t)=10,362

An overflow window will close in 55,174 periods (each period is 1/1000 of a second) which may be about 55 seconds. FIG. 2c illustrates an example of a rolling time window and how a now period may overflow within an overflow window. At the bottom of FIG. 2C, in the "Period overflow", the former "now period" is now an "old period", and the new "now period" is located in what was previously the "future periods". This represents a period rolling to a next time section.

In the event that one or more time periods may have expired, the token refill module 216 may be configured to add additional tokens to each token balance of the rate limiters 226. For example, a predetermined number of tokens may be added to a token balance for each rate limiter 226 included in a group of rate limiters 226 as a result of an expiration of a time unit as determined by the time counter 228. As such, the same number of tokens may be added to each rate limiter 226 included in the group of rate limiters 226.

In one example, a predetermined number of tokens may be added to the token balance of each rate limiter 226 for each time unit that may have expired up to the token capacity of the rate limiters 226. For example, when adding a predetermined number of tokens to the token balances for each rate limiter 226, the lesser amount of the predetermined number of tokens and the token capacity minus the current token balance of a rate limiter 226 may be added to the token balances.

Adding a predetermined number of tokens to the token balance for each rate limiter 226, in one example, may be performed using vector instructions. The vector instructions for a processor 220 may be used to add the predetermined number of tokens to the token balance of each rate limiter 226 included in a group of rate limiters 226. As one example, vector instructions used to add the predetermined number of tokens to the token balance for each rate limiter 226 in a group of rate limiters 226 may be SIMD (Single Instruction Multiple Data) instructions. As a result, an efficiency may be realized when vector instructions are used to add tokens to the rate limiters 226 stored in the cache 222 of a processor 220.

The services and modules included in the server computer 208 and/or the components of the computing service environment 202 may be accessed using API calls, procedure calls or other network commands according to different technologies. Communication between the server computer 208 and various devices included in the computing service environment 202 may be performed using, but not limited to, Representational State Transfer (REST) technology or Simple Object Access Action (SOAP) technology. REST is an architectural style for distributed hypermedia systems. A RESTful API (which may also be referred to as a RESTful web service) is a web service API implemented using HTTP and REST technology. SOAP is an action for exchanging information in the context of Web-based services.

The various processes and/or other functionality contained within the server computer 208 may be executed on the one or more processors 220 that are in communication with the one or more memory modules 224. The computing service environment 202 may include a number of server computers 208 that are arranged, for example, in one or more server banks or computer banks or other arrangements. The server computers 208 may support a computing environment using hypervisors, virtual machine monitors (VMMs) and other virtualization software.

A source client included in a source network 232 may include any device capable of sending and receiving data over a network 230. A source client may comprise, for example a processor-based system such as a computing device. A source client may be a device such as, but not limited to, a desktop computer, laptop or notebook computer, tablet computer, handheld computer, workstation, network computer, or other devices with like capability.

The network 230 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
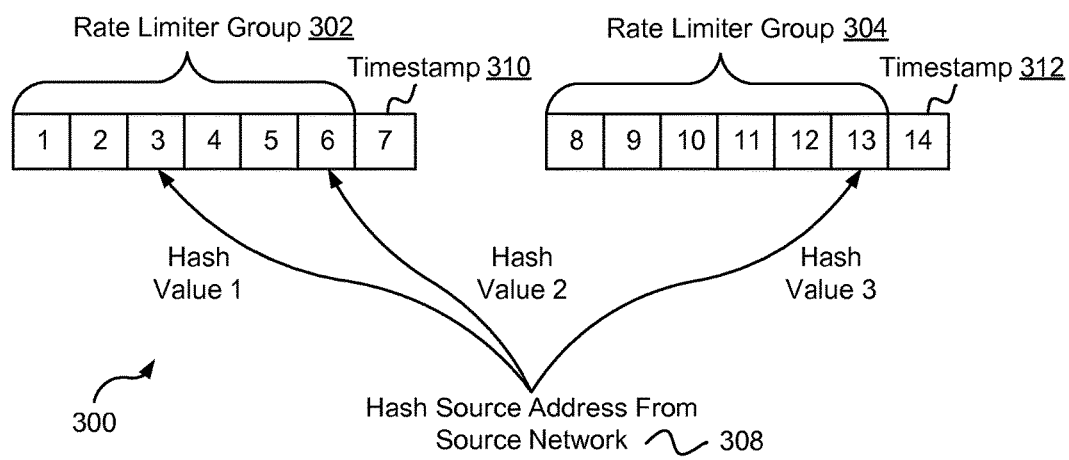
FIG. 3 is a diagram that illustrates example data structures used to limit the rate at which a number of requests are granted.

FIG. 3 is a diagram illustrating example data structures 300 used for limiting the rate at which requests made by clients from source networks are granted. The data structures 300 may each include a set of rate limiters 302 and 304 configured to store a number of tokens and a timestamp 310 and 312 for each rate limiter group 302 and 304. The rate limiters 302 and 304 may be contained in computer memory, such that each rate limiter group 302 and 304 may be associated with a memory a memory location. A token capacity may be defined for rate limiter group 302 and 304. As a result, when tokens are added to a rate limiter, the token balance for the rate limiter may not exceed the token capacity for the rate limiter group 302 and 304.

The locations within memory may correspond to hash values produced by hashing source network addresses 308 for source networks. In one example configuration, a source network address 308 may be derived from a network address (e.g., an IP address) associated with a request to forward a network communication (e.g., a communication used to establish a connection with a destination host). The source network address 308 may be a network address of a source client or source client IP address. As a result, instead of representing every network address that could conceivably connect to a destination host in memory (which may exceed 1 billion addresses), a source network representing a plurality of source clients may be represented by hashing source clients' network addresses to rate limiters.

As illustrated, k hash values may be generated using k number of hash functions from the source network address 308. For example, using three different hash functions, three hash values may be generated using a source address from the source network 308. The hash values may map to different locations in memory, which may contain a rate limiter. As such, by way of the hash values, the rate limiters may be associated with the source network 308.

Figure 4:
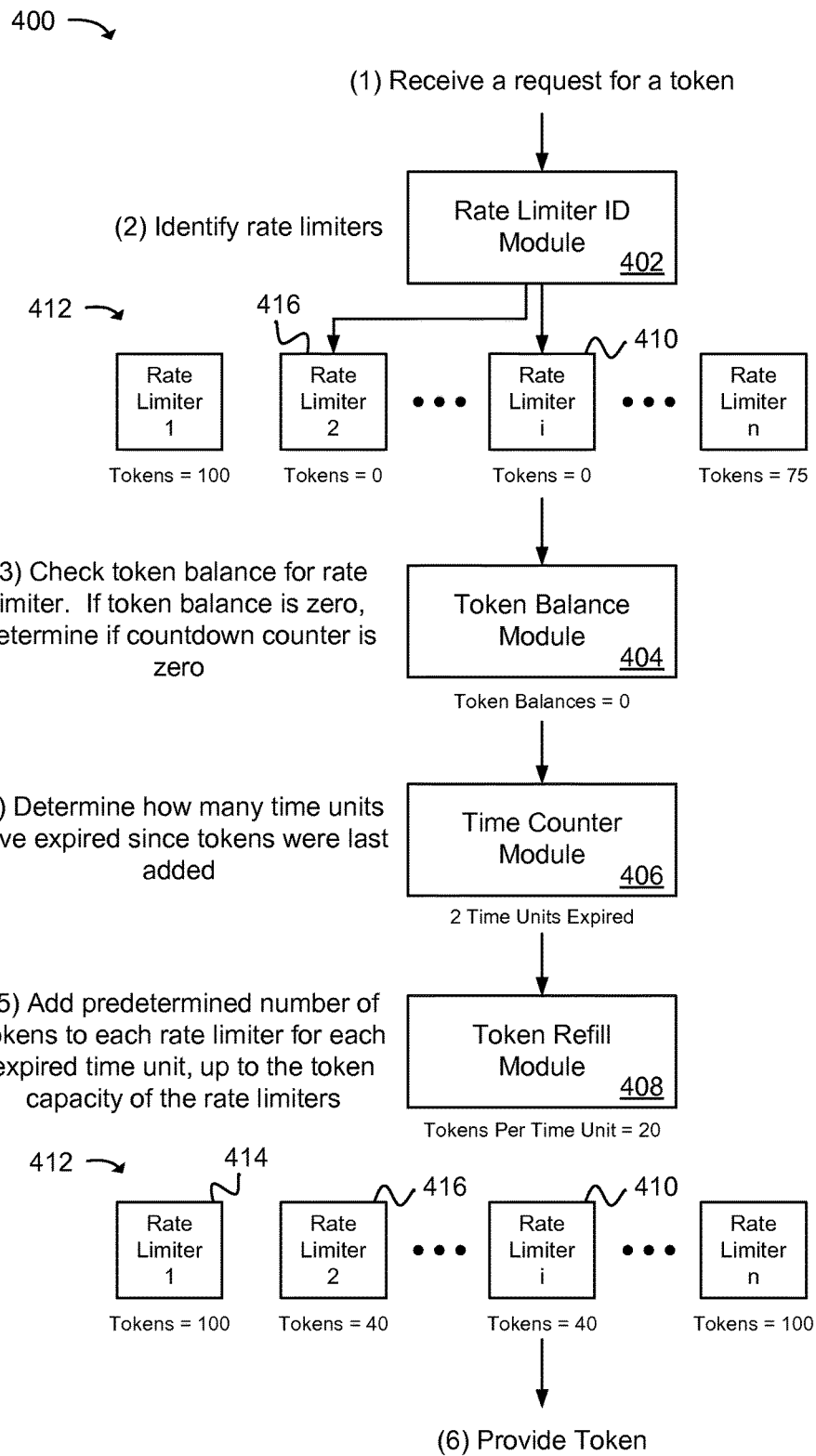
FIG. 4 is a flow diagram illustrating an example method for distributing tokens in response to a request originating from a source network.

FIG. 4 illustrates one example of a method 400 for distributing tokens in response to a request originating from a source network to further process (e.g., forward) a network communication. As illustrated, (1) a token request made in response to a request received from a source network may be received at a token distribution service. The token request may be in response to a request to communicate with another device in a computer network (e.g., a destination host), wherein an available token granting the communication may be distributed from a rate limiter 410 associated with the source network.

In determining whether a token may be available to distribute in response to the request, (2) rate limiters 410 and 416 for the source network may be identified. For example, a rate limiter ID module 402 may use a Bloom limiter as described in FIG. 3 that generates multiple hash values from a source network identifier (e.g., a client device address from a source network) using multiple hash functions. The hash values may then be used to identify rate limiters 410 and 416 by mapping the hash values to memory locations containing the rate limiters 410 and 416.

After identifying the rate limiters 410 and 416, (3) a token balance for the rate limiters 410 and 416 may be checked to determine whether the rate limiters 410 and 416 contain available tokens that can be distributed in response to the request. For example, a token balance module 404 may be used to check the token balances of the rate limiters 410 and 416. Each rate limiter included in a set of rate limiters 412 may contain a token balance that may be reduced as tokens are distributed in response to requests made from clients or computing devices in source networks. As a result, the token balances among the different rate limiters included in the set of rate limiters 412 may vary according to a number of requests made from a source network associated with a particular rate limiter. Therefore, rate limiters 410 and 416 that may be receiving a large number of requests may become depleted of tokens prior to other rate limiters included in the set of rate limiters 412, which may have the effect of restricting network access of the source networks that may be sending a high level of incoming requests while allowing other source networks access to the network.

In the event that rate limiters 410 and 416 may have a token balance of zero when the token balance of the rate limiters 410 and 416 are checked, a determination may be made whether a time unit has expired since the last time tokens where added to the rate limiters 410 and 416, and if so, (4) how many time units have expired since tokens were last added. In one example, a time counter module 406 may be used to reference a time counter. The time counter may indicate an amount of time that has passed since tokens where last added to the rate limiters 410 and 416.

Computer processing resources may be conserved by adding tokens to the set of rate limiters 412 when token balances for the rate limiters 410 and 416 are checked and the token balances are equal to zero, as opposed to adding a predetermined number of tokens to the set of rate limiters 412 at the expiration of every time unit. For example, several time units may expire prior to a token balance becoming depleted, during which time the set of rate limiters 412 may continue to distribute tokens.

After determining how many time units may have expired, (5) a predetermined number of tokens may be added to each rate limiter included in the set of rate limiters 412 for each time unit that has expired, up to the token capacity of the rate limiters 412. For example, a token refill module 408 may be used to add a predetermined amount of tokens to each of the rate limiters included in the set of rate limiters 412. The predetermined amount of tokens may be added for each expired time unit. As a specific example, where a predetermined amount of tokens per time unit may be twenty tokens and two time units may have expired, forty tokens may be added to the rate limiter 410.

When adding the predetermined amount of tokens to the set of rate limiters 412, the token capacity of the set of rate limiters 412 may be considered. For example, a token capacity may be defined for the set of rate limiters 412 so that each rate limiter included in the set of rate limiters 412 may store a limited number of tokens equal to the token capacity. Therefore, a number of tokens added to a rate limiter may not result in a token balance that exceeds the token capacity for the rate limiter. As a specific example, no tokens may be added to a particular rate limiter 414 where the token balance of the rate limiter 414 may be one hundred tokens and a token capacity for each of the set of rate limiters 412 may be one hundred tokens.

Having added tokens to the set of rate limiters 412, the rate limiters 410 and 416 for the source network may now have a token balance greater than zero enabling the distribution of a token from one of the rate limiters 410 and 416 in response to the request from the source network. Accordingly, (6) a token may be provided (e.g., to a network node that forwards network communications) granting the request made from the source network. More specifically, the request made by the source network may be allowed to be transmitted to a destination host and the token balance for the rate limiter that provided the token may be reduced by one token.

Figure 5:
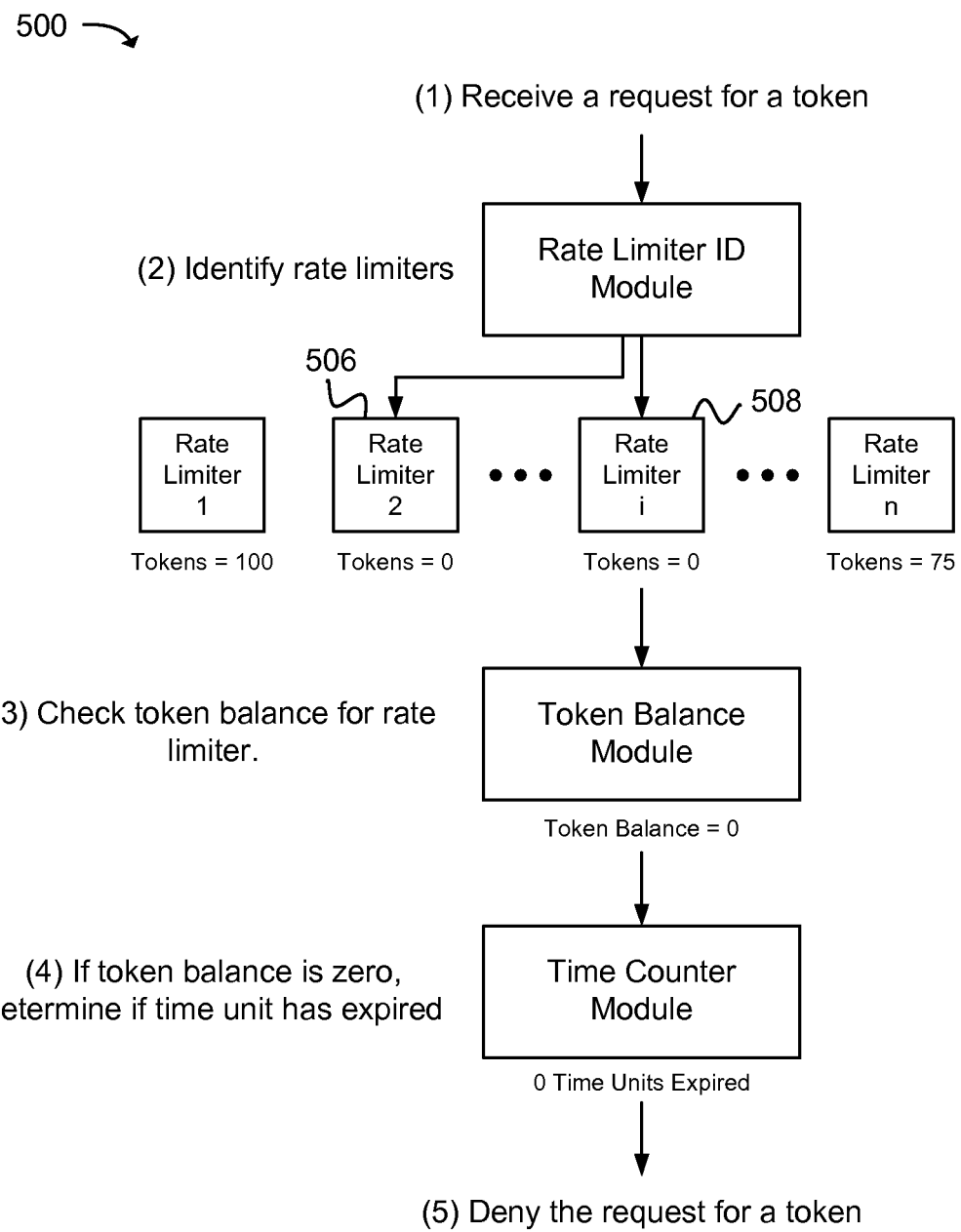
FIG. 5 is a flow diagram that illustrates an example method for distributing a token in response to a request originating from a source network where the request is denied.

Moving now to FIG. 5, a diagram illustrates an example method 500 for distributing a token in response to a request originating from a source network to perform a network action where the request is denied. As illustrated, (1) a request may be received from a source network to perform a network action, where a token granting the action may be distributed from a rate limiter 506 or 508 associated with the source network when at least one of the rate limiters 506 and 508 have an available token.

In determining whether a token may be available to distribute in response to the request, (2) rate limiters 506 and 508 for the source network may be identified as described earlier. Next, (3) a token balance for the rate limiters 506 and 508 may be checked to determine whether either of the rate limiters 506 and 508 contain an available token. If the token balances for the rate limiters 506 and 508 are zero, (4) a determination may be made whether one or more time units have expired, thereby allowing for additional tokens to be added to the rate limiters 506 and 508. In the case that at least one time unit has not expired, (5) the request received from the source network may then be denied as a result of a token not being available to distribute in response to the request.

Figure 6:
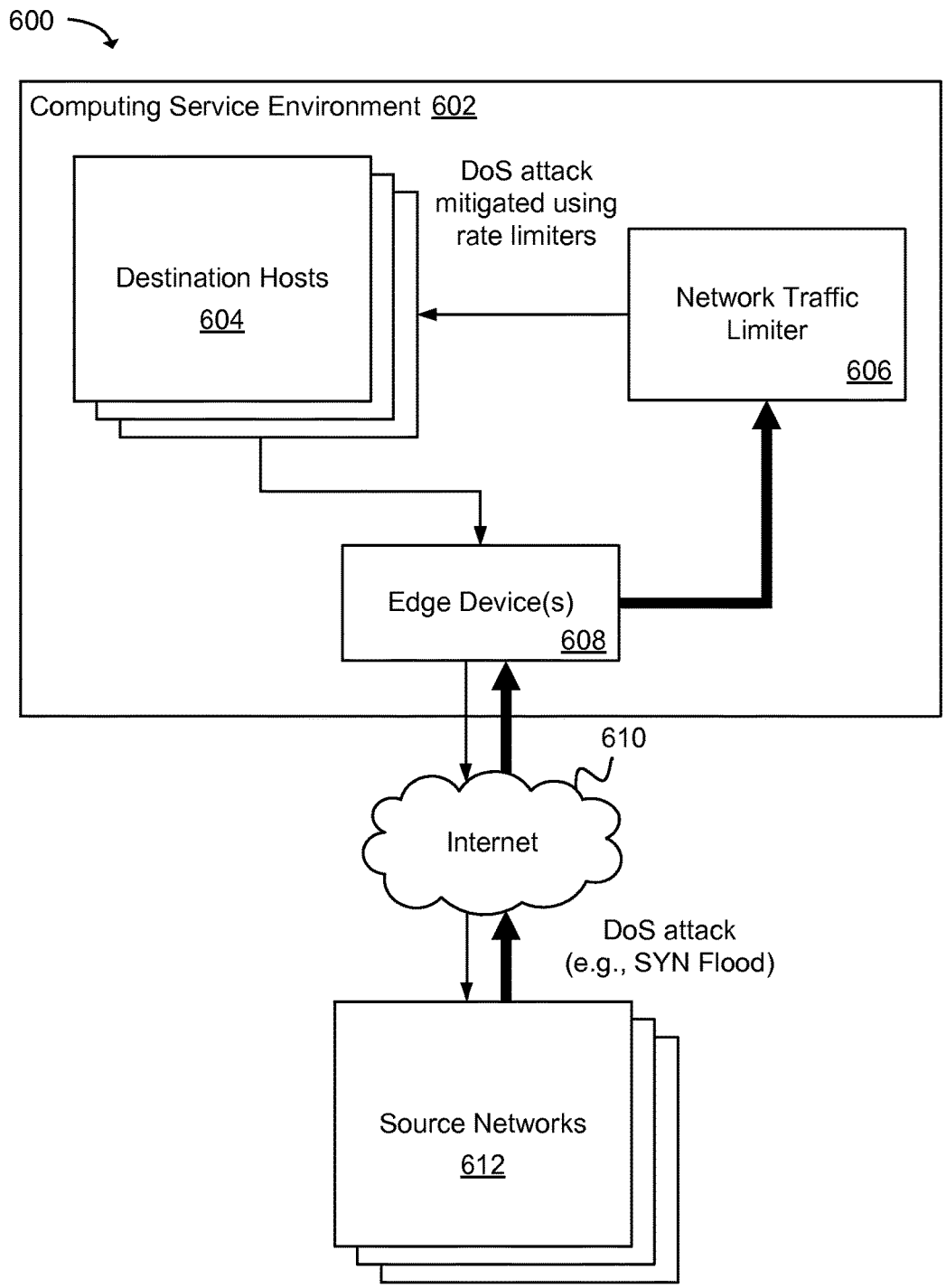
FIG. 6 is a block diagram illustrating an example system for regulating an amount of network traffic sent by source networks to destination hosts.

FIG. 6 is a block diagram illustrating an example of a system 600 for regulating an amount of network traffic sent to destination hosts 604 originating from a plurality of source networks 612. The system 600 may include a computing service environment 602 containing a number of components that may be in communication with a plurality of source clients. As described earlier, the source networks 612 may include multiple source clients requesting to connect to destinations hosts 604 contained within the computing service environment 602.

As illustrated, the computing service environment 602 may include one or more edge devices 608, a network traffic limiter 606 and a number of destination hosts 604. The network traffic limiter 606 may be a hardware device or software on a hardware device (e.g., a server) configured to regulate an amount of network traffic that reaches an intended destination host 604 originating from one or more source networks 612 using the rate limiters previously described.

As one specific example where a network traffic limiter 606 may be used to regulate an amount of network traffic intended for a destination host 604, a type of DoS (Denial of Service) attack called a SYN flood may be mitigated using rate limiters that may be included in a network traffic limiter 606. In the event of a SYN flood, a succession of SYN requests are sent to one or more destination hosts 604 in an attempt to consume enough of the destination hosts' resources as to make a destination host 604 unresponsive to non-malicious network traffic. A SYN request is part of a TCP protocol where a source client included in a source network 612 sends a SYN (synchronize) message to a destination host 604. The destination host 604 then sends a SYN-ACK (synchronize acknowledge) message back to the source client, whereupon the source client responds with an ACK (acknowledge) message.

In the event of a SYN flood, one or more source clients included in a source network 612 will not respond to a destination host 604 with an expected ACK message. As a result, the destination host 604 may wait for the ACK message for a period of time resulting in a half-open connection that binds computing resources used to create the half-open connection. The above process may be repeated for each SYN request received that is not acknowledged by a source client until an amount of computing resources may be consumed that causes the destination host 604 to be unable to respond to non-malicious network traffic.

The network traffic limiter 606 may be able to mitigate the effects of a SYN flood by providing a rate limiter for each source network 612 that makes SYN requests to a destination host 604 within the computing service environment 602. The rate limiter may allow up to a certain number of SYN requests and other communications (e.g., packets) to be transmitted to a destination host 604 within a defined time period. Any SYN requests and communications beyond the certain number of communications allowed may be dropped by the network traffic limiter 606.

One specific example of a method used by a network traffic limiter 606 to mitigate a malicious network attack may include receiving a network packet sent through a computer network 610 from a source network 612. A request for a token granting permission to transmit the network packet to a destination host 604 may be made by identifying rate limiters for the source network 612 and determining whether any of the rate limiters have an available token that can be distributed in response to the request for the token. In the case that the rate limiters do not have an available token and a defined time period has not expired allowing for additional tokens to be added to the rate limiter, the network packet may be dropped, thereby mitigating the network attack by preventing the network packet from reaching an intended destination host 604.

Figure 7:
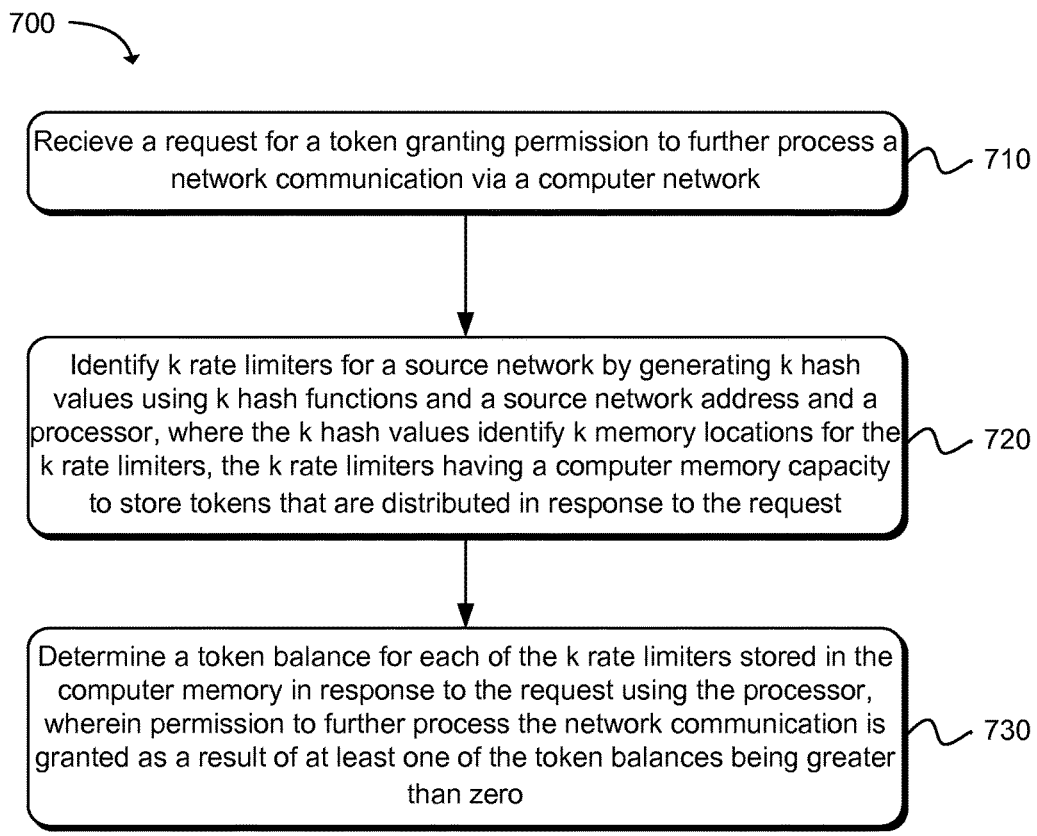
FIG. 7 is a flow diagram illustrating an example method for rate limiting various requests received from one or more source networks by issuing a predetermined number of tokens granting the requests according to a set time period.

FIG. 7 is a flow diagram illustrating an example of a method 700 for rate limiting a large number of requests received from one or more source networks by issuing a predetermined number of tokens granting the requests according to a set time period. Beginning in block 710, a request for a token granting permission to further process a network communication may be received via a computer network. The request may be associated with a network address (e.g., IP address) used to identify a source network.

As in block 720, k rate limiters may be identified for a source network by generating k hash values using k hash functions and a source network address, where the k hash values identify k memory locations for the k rate limiters, and the k rate limiters have a computer memory capacity that stores tokens that may be distributed in response to the request.

In one example, a predetermined number of tokens may be added to the token balance for each rate limiter included in a group of rate limiters as a result of an expiration of a time unit as determined by the time counter where the time counter may be used to demarcate a time unit in which an allocation of tokens may be added to the token balance for the rate limiter. For example, determining a token balance for the rate limiter in response to the request for the token may include determining an expiration of a number of time units as determined by the time counter since the token balance was last determined and adding the predetermined number of tokens to the token balance for each of the number of time units that may have expired.

As in block 730, a token balance for each of the k rate limiters stored in the computer memory may be determined in response to the request, where permission to further process the network communication (e.g., forward the network communication) may be granted as a result of at least one of the token balances being greater than zero. For example, the token may be provided to a requester granting permission to further process the network communication as a result of the token balance of at least one of the k rate limiters being greater than zero, whereupon the token balance for the rate limiter providing the token may be decremented by one token as a result of providing the token. In the event that the token balance for each of the rate limiters may be equal to zero, the permission to further process the network communication may be denied. In particular embodiments, a token balance may be decremented by multiple tokens. Multiple tokens may be removed if, for example, instead of counting a number of packets, a number of allowed bytes are counted.

Figure 8:
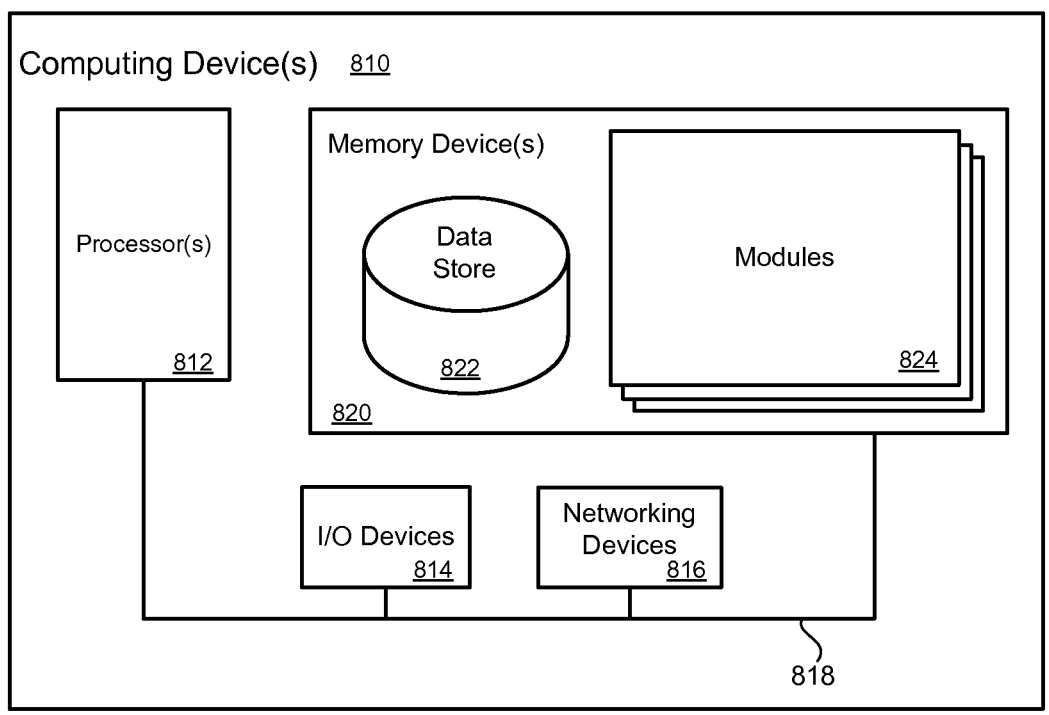
FIG. 8 is block diagram illustrating an example of a computing device that may be used to execute a method for rate limiting various requests received from source networks.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may include a rate limiter ID module, a token balance module, a token refill module, a time counter module, as well as other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, wherein the instructions, when executed by a processor, cause the processor to:
   receive a request for a token granting permission to perform a network action, wherein the request is associated with an IP (Internet Protocol) address used to identify a source network;
   identify k rate limiters for the source network by generating k hash values from the IP address using k hash functions where the k hash values identify k memory locations containing the k rate limiters and where k is a natural number greater than zero, a given rate limiter being included in a group of rate limiters having a time counter where each rate limiter has a capacity to store a number of tokens and where tokens are added to each of the rate limiters in the group of rate limiters according to the time counter, wherein a predetermined number of tokens are added to each of the rate limiters in the group of rate limiters as a result of the request for the token being received and a value of the time counter being zero;

determine a respective token balance for each of the k rate limiters for the source network in response to the request;

determine that at least one token balance for a k rate limiter is greater than zero; and provide a token in response to the request.

2. A non-transitory machine readable storage medium as in claim 1, wherein the instructions further cause the processor to:

determine an expiration of at least one time unit as a result of checking the token balances for the k rate limiters and the token balances being equal to zero; and add the predetermined number of tokens to each rate limiter included in the group of rate limiters for each time unit that has expired.

3. A non-transitory machine readable storage medium as in claim 1, wherein the k rate limiters are identified in response to the request for the token, the token granting permission to a source client to connect to a destination host via a computer network.

4. A computer implemented method, comprising:

receiving a request for a token granting permission to process a network communication via a computer network;

identifying, using a processor, k rate limiters for a source network by generating k hash values using k hash functions and a network address representing the source network where the k hash values identify k memory locations for the k rate limiters, the k rate limiters having a computer memory capacity to store tokens that are distributed in response to the request, wherein k is a natural number greater than zero;

determining that at least one token balance for the k rate limiters stored in the computer memory is greater than zero in response to the request using the processor;

granting permission to process the network communication; and decrementing the at least one token balance.

5. A method as in claim 4, further comprising providing the token to a requester granting permission to process the network communication as a result of the at least one of the token balances being greater than zero.

6. A method as in claim 4, further comprising denying permission to a requester to further process the network communication when one of the token balances is equal to zero and a time counter has not expired.

7. A method as in claim 4, wherein identifying the k rate limiters for a source network further comprises, identifying the k rate limiters included in at least one group of rate limiters, wherein each group of rate limiters includes a respective countdown timer that represents when tokens are added to rate limiters included in that group of rate limiters.

8. A method as in claim 4, further comprising adding a predetermined number of tokens to a respective token balance for each of the k rate limiters included in a group of rate limiters as a result of an expiration of a time unit as determined by a time counter.

9. A method as in claim 4, wherein a time counter is used to demarcate a time unit in which an allocation of tokens is added to each of the token balances of at least a subset of the k rate limiters.

10. A method as in claim 4, wherein determining respective token balances for k rate limiters in response to the request comprises:

determining an expiration of a number of time units as determined by a time counter since the respective token balance was last determined; and adding a predetermined number of tokens to the respective token balance for each of the number of time units that have expired.

11. A method as in claim 10, wherein adding the predetermined number of tokens to the respective token balance for each rate limiter is performed using vector instructions for the processor that add the predetermined number of tokens to the respective token balance of each of the k rate limiters included in a group of rate limiters.

12. A method as in claim 10, wherein adding the predetermined number of tokens to the respective token balance further comprises, determining a maximum token capacity of a given rate limiter and adding a number of tokens equal to a lesser of the predetermined number of tokens and the token capacity minus a current token balance of the given rate limiter.

13. A method as in claim 10, wherein the time counter references a timestamp that records a last refill period.

14. A method as in claim 13, further comprising:

comparing a system time with the timestamp; and determining whether a predetermined amount of time has passed since the last refill period based on the comparing the system time with the timestamp.

15. A method as in claim 10, wherein an increment of the time counter represents a time unit within which an allocation of the predetermined number of tokens are allocated to each of the k rate limiters.

16. A method as in claim 4, wherein a size of a group of the rate limiters is based on the size of a cache line of the processor, the cache line storing a time counter.

17. A system comprising:

a processor;

a memory device including instructions that, when executed by the processor, cause the system to:

identify k rate limiters for a source network by generating k hash values from a network address representing the source network using k hash functions where the k hash values identify k memory locations containing the k rate limiters where k is a natural number greater than zero;

include a rate limiter of the k rate limiters in a group of rate limiters having a countdown timer, where each rate limiter of the k rate limiters can store a number of tokens used to grant permission to forward a network communication, wherein tokens are added to each rate limiter in the group of rate limiters according to a time counter of the group;

determine respective token balances for the k rate limiters, wherein a predetermined number of tokens are added to each of the token balances of the rate limiters included in the group of rate limiters as a result of an expiration of a time unit as determined by the time counter;

expiration of at least one time unit is checked for as a result of checking the token balances of the k rate limiters and adding the predetermined number of tokens to the token balances of the rate limiters included in the group of rate limiters for each time unit that has expired;

provide a token as a result of at least one of the token balances of the k rate limiters being greater than zero; and decrement a token balance for a rate limiter included in the k rate limiters as a result of providing a token.

18. A system as in claim 17, wherein the instructions further cause the system to identify the k rate limiters in response to a request for a token that grants permission to a source client to connect to a destination host via a computer network.

19. A system as in claim 17, wherein the instructions further cause the system:

receive a network packet sent through a computer network;

request a token granting permission to transmit the network packet to a destination host; and drop the network packet as a result of the respective token balances for the k rate limiters being equal to zero, thereby mitigating a network attack by preventing the network packet from reaching an intended destination host.

20. A system as in claim 17, wherein the instructions further cause the system to add the predetermined number of tokens to the token balance for each rate limiter included in a group of rate limiters using a SIMD (Single Instruction Multiple Data) instruction for the processor.

* * * * *